United States Patent [19]

Liebel

[11] Patent Number: 5,543,205
[45] Date of Patent: *Aug. 6, 1996

[54] COMPOSITE ARTICLE MADE FROM USED OR SURPLUS CORRUGATED BOXES OR SHEETS

[75] Inventor: Henry L. Liebel, Newport, Ky.

[73] Assignee: Corrcycle, Inc., Roswell, Ga.

[*] Notice: The term of this patent shall not extend beyond the expiration date of Pat. No. 5,366,790.

[21] Appl. No.: 187,306

[22] Filed: Jan. 26, 1994

Related U.S. Application Data

[63] Continuation-in-part of Ser. No. 994,205, Dec. 21, 1992, Pat. No. 5,366,790, which is a continuation-in-part of Ser. No. 715,442, Jun. 14, 1991, abandoned.

[51] Int. Cl.$^6$ ............................ B32B 3/28; B65D 19/00
[52] U.S. Cl. ................ 428/184; 428/34.2; 428/120; 428/182; 428/186; 428/188; 428/189; 108/51.3; 52/783.11; 52/783.18; 220/441; 206/386; 206/521
[58] Field of Search ................... 428/182, 184, 428/119, 120, 188, 186, 34.2, 192, 212, 77, 189, 44, 55; 108/51.1, 56.1, 51.3; 206/386, 521; 220/441, 903; 229/90; 52/783.11, 783.18

[56] References Cited

U.S. PATENT DOCUMENTS

| | | | |
|---|---|---|---|
| 2,221,309 | 11/1940 | Gazelle | 154/45 |
| 2,417,435 | 3/1947 | Munters | 154/45 |
| 2,543,101 | 2/1951 | Francis | 154/101 |
| 3,519,525 | 7/1970 | Fourness | 161/120 |
| 3,590,751 | 7/1971 | Freid | 108/51 |
| 3,661,099 | 5/1972 | Sheler | 108/51 |
| 3,743,568 | 7/1973 | DeWolf | 161/68 |
| 3,810,798 | 5/1974 | McCoy | 56/62.2 |
| 3,837,989 | 9/1974 | McCoy | 56/62.2 |
| 4,111,730 | 9/1978 | Balatinecz | 156/62.2 |
| 4,146,660 | 3/1979 | Hall et al. | 428/2 |
| 4,241,133 | 12/1980 | Lund et al. | 428/326 |
| 4,401,706 | 8/1983 | Sovilla | 428/158 |
| 4,424,753 | 1/1984 | Eatherton | 428/184 |
| 4,810,445 | 3/1989 | Lamb, Sr. et al. | 264/112 |
| 5,059,466 | 10/1991 | Blumer | 428/106 |
| 5,137,668 | 8/1992 | Lamb, Sr. | 264/112 |
| 5,366,790 | 11/1994 | Liebel | 428/184 |

FOREIGN PATENT DOCUMENTS

| | | |
|---|---|---|
| 262898 | 4/1988 | European Pat. Off. |
| 355056 | 6/1922 | Germany. |
| 152083 | 9/1983 | Japan. |
| 233354 | 9/1990 | Japan. |
| 495615 | 11/1938 | United Kingdom. |
| 675790 | 7/1952 | United Kingdom. |

Primary Examiner—Donald J. Loney
Attorney, Agent, or Firm—Wood, Herron & Evans, P.L.L.

[57] ABSTRACT

A composite article useful as a material of construction made of a plurality of individual pieces of corrugated cardboard cut from scrap corrugated boxes or sheets. The corrugated pieces lie in a shingle-like configuration, a bridge-like configuration, or a combination thereof and form multiple, generally planar layers of individual corrugated cardboard pieces having a length only a fraction of the full length of the article. The material of construction is particularly useful in making shipping pallets to replace wood pallets currently in use and as a substitute for wood products in general.

8 Claims, 6 Drawing Sheets

COMPOSITE ARTICLE MADE FROM USED OR SURPLUS CORRUGATED BOXES OR SHEETS

CROSS-REFERENCE TO RELATED APPLICATIONS

This application is a continuation-in-part of application Ser. No. 07/994,205, filed Dec. 21, 1992, U.S. Pat. No. 5,366,790 which is a continuation-in-part of application Ser. No. 07/715,442, filed Jun. 14, 1991, now abandoned.

BACKGROUND OF THE INVENTION

In today's environment, it is generally recognized to be desirable to recycle as many materials as possible. These include, for example, glass and plastic containers, metal containers such as aluminum and steel, and paper goods, for example, used newspaper and corrugated boxes and sheets. In recycling of corrugated boxes and sheets, it is well known to crush them, bale them, and send them to a hydropulper operation to pulp the corrugated so that it may then be put through the papermaking and corrugating process again. However, recycling by hydropulping is both energy intensive and relatively expensive. If the market for used or surplus corrugated material is not economically justified, there is little incentive for recycling the corrugated.

At the same time, it is known to construct various articles useful in the transportation and shipping industry out of wood. For example, it is well known to construct out of wood shipping pallets upon which goods are loaded for transportation. These shipping pallets include a number of wood slats which span and are secured by nails or staples to wood supports providing an offset of the slats from the floor whereby the tines of a forklift truck can be placed under the pallet for lifting of the pallet with the load thereon. Wood pallets are used widely throughout industry today. However, wood pallets present a significant disposal problem. They cannot be burned for environmental reasons and thus must be disposed of in landfills. However, wood pallets do not easily decompose in landfills and take a significant volumetric portion of the available landfill space. Therefore, they may be chopped up and destructed for disposal in landfills but still do not degrade. Thus, wood pallets widely in use today present a significant disposal problem.

SUMMARY OF THE INVENTION

It is among the principal objects of this invention to provide an improved composite article useful as a material of construction formed from used or surplus corrugated boxes or sheets which eliminates the need for repulping of the used corrugated. This material of construction can be used to make a number of different articles. One article to which it is particularly suited is in the manufacture of shipping pallets formed entirely from scrap corrugated boxes or sheets thereby offering an attractive use of used corrugated boxes and sheets and an attractive alternative to hydropulping to recycle these used materials. Moreover, the shipping pallets of the present invention can themselves be destructed by hydropulping and the paper material reused thus eliminating the disposal problem with wood pallets entirely. As a result, the material of construction of the present invention presents essentially no environmental burden at all.

The composite article of the present invention is composed of a number of substantially aligned, individual pieces of corrugated cardboard which are cut from scrap corrugated boxes or sheets. The pieces are situated with respect to one another such that they lie in a shingle-like configuration, a bridge-like configuration, or a combination of the two, forming multiple, generally planar layers comprised of the individual cardboard pieces. The pieces in each planar layer, being cut from used boxes or sheets, have a length which is only a fraction of the full length of the article and the individual pieces are preferably adhered to adjacent pieces.

The present invention is predicated on the discovery that an improved article of construction may be formed by taking used scrap or surplus corrugated boxes or sheets, slitting them into strips and then slitting the strips at right angles to form multiple individual, essentially rectangular pieces of used corrugated cardboard. These pieces are then stacked one upon another and can be aligned, if desired, so that the flute direction of the individual pieces are generally in the same direction. The individual pieces are disposed and adhered to each other such that they lie in a shingle-like configuration, a bridge-like configuration, or a combination thereof. The layered pieces of corrugated are cut to a predetermined length and stacked to a desired height with adjacent layers again being adhered thus forming an article having multiple, generally planar layers comprised of the individual corrugated cardboard pieces of a defined length with the individual corrugated cardboard pieces having a length only a fraction of the full length of the article.

The composite article thus has a predetermined height, length, and depth defined by the size of the individual rectangular pieces cut from the scrap corrugated boxes or sheets, the cutoff length of the planar layers, and the stacking height of the multiple layers. This article may then be sawed, e.g., with band saws, to form slabs or blocks or other configurations useful in constructing various articles.

In one form of the invention, one of the articles constructed therefrom is a shipping pallet. In this connection, the composite article is sawed, for example, by means of a band saw to produce slabs of a desired thickness. The horizontal support structure of the pallet is formed by edge abutting and gluing several slabs together, preferably with the corrugated flutes being oriented perpendicular to the upper and lower faces thereof, and securing paperboard facing sheets to the upper and lower faces of the edge abutted slabs. The support legs for the shipping pallet are likewise cut from the composite article and adhered to the facing sheet on the underside of the horizontal support surface again with the flutes running in the direction perpendicular thereto. The resulting pallet has a relatively high degree of compressive strength but yet is relatively lightweight and inexpensive to produce. Further, it is not subject to cracking and splintering as are wood pallets. It contains no nails or staples which otherwise present disposability problems for wood pallets. Rather, to dispose of the shipping pallet of the present invention, it is merely necessary to hydropulp it with the resulting pulp being available for remanufacture of corrugated board.

In another presently preferred form of the invention, a shipping pallet is constructed of nine equally spaced blocks of the composite article of the present invention to which a top sheet formed, for example, of a new corrugated paperboard sheet or chipboard or paper honeycomb material is adhered. Spacing between the blocks provides openings for receiving lift means such as the tines of a forklift truck.

In a further embodiment of the invention, the composite article of the present invention provides a substitute for lumber pieces such as a nominal 2×4 inch article. In this connection, the composite article of the present invention is sawed in the nominal cross-sectional dimensions and of a desired length, for example, 4 feet long. The larger facing surfaces of the individual pieces may be provided with a paper faced by adhering a paper sheet thereto to provide a completed product. The resulting product has a number of applications and may be used where wooden 2×4's are used. In one presently preferred application, the composite articles are glued or stapled into the four corners of a box, for example, a corrugated box to provide a box having a vertical corner posts thereby providing the box with improved stacking strength. Whem it is desired to dispose of the box, the entire box including the corner posts may be simply hydropulped.

DETAILED DESCRIPTION OF THE INVENTION

Figures 1, 5:
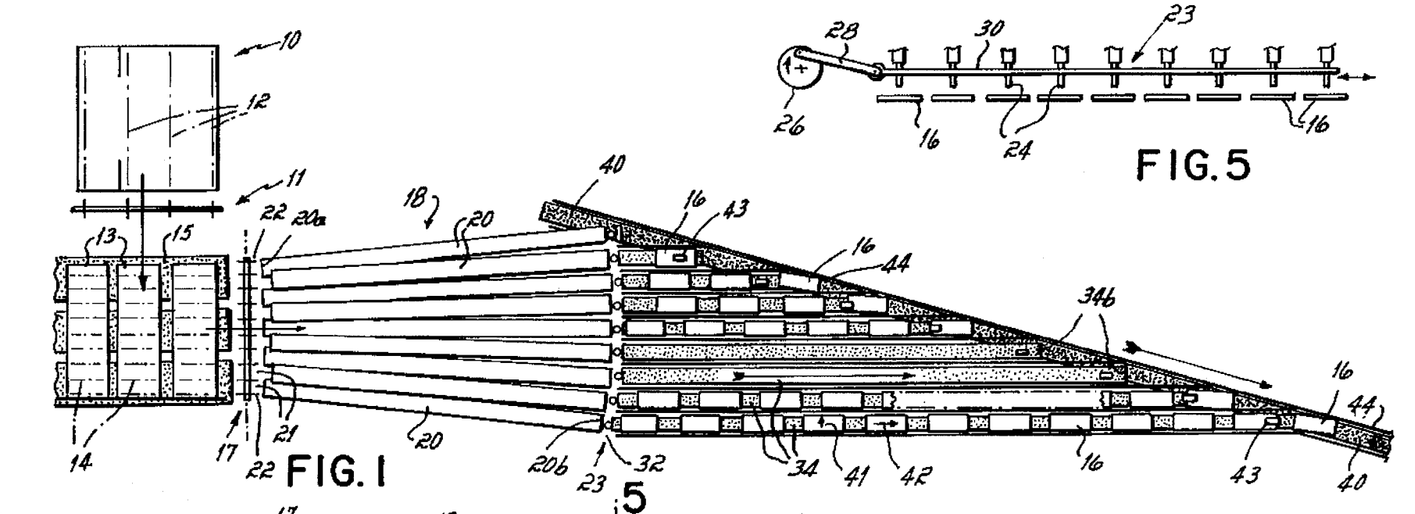
FIG. 1 is a plan view of a scrap corrugated box in flattened condition showing cut lines for producing the individual corrugated cardboard pieces and a top view of one end of the apparatus used in the manufacture of the composite article of the present invention.
FIG. 5 is a view taken along line 5—5 of FIG. 3A.

Referring first to FIG. 1, in the method of manufacture of the composite article of the present invention, used scrap or surplus corrugated boxes or sheets 10 are first gathered, flattened and put through a first slitter 11 to cut the boxes 10 into strips 13 of a desired width, which in a presently preferred form of the invention is on the order of 8½ inches wide. The used or scrap corrugated boxes 10 are first cut into strips 13 along cut line 12 in a first direction. These strips are then deposited onto a conveyor 15 moving in a direction perpendicular to the longitudinal axis of the strips 13. The conveyor 15 advances the strips 13 through a second slitter 17 where they are cut at right angles along spaced cut lines 14 to form corrugated pieces 16 on the order, e.g., of 8½-inch×24-inch rectangles. That is, corrugated boxes of a standard dimension of 24×36 inches, for example, can be conveniently cut on 8½-inch centers to produce individual corrugated cardboard pieces generally of a 8½×24 inch dimension. It will be recognized that these are only rough dimensions since because of non-uniformity of scrap boxes the pieces produced may likewise be somewhat non-uniform. In addition, smaller pieces resulting, for example, from cutting of the end flaps of the box may be produced. These smaller pieces may be either sorted out and discarded or may be incorporated into the composite article of the present invention without adverse effects. It has been found, however, that generally it is desired that 60% or more of the corrugated pieces 16 be of the preferred large dimension and of generally the same size and shape.

Referring once again to FIG. 1, the individual corrugated pieces 16 are loaded automatically into a load reservoir 18 which includes a series of conveyors 20. The series of nine conveyors 20 are shown such that the leading end 20a of each individual conveyor is aligned with a spacing 21 between adjacent blades 22 on the second slitter 17 to receive the corrugated piece 16 produced by the individual portion of the slitter.

Figure 3A:
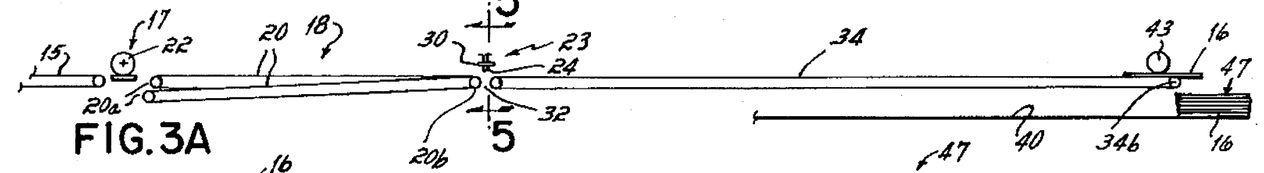
FIG. 3A–3C is a side elevation schematic illustration showing the method of manufacture of the composite article of the present invention.

The conveyors 20 diverge such that the leading end 20a of each conveyor 20 is more closely spaced with the adjacent conveyor than a trailing end 20b thereof. This configuration allows the trailing end 20b of the conveyors 20 to be vertically aligned generally in the same horizontal plane as shown in FIG. 3A. It will recognized that although nine individual conveyors are shown and described, this number can be varied within the scope of this invention as required to-produce the desired article or array configuration of corrugated pieces 16.

Figure 2:
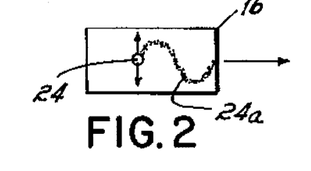
FIG. 2 is a schematic plan view of the sinuous glue pattern as applied to a corrugated piece.

The corrugated pieces 16 advance toward the trailing end 20b of the conveyors 20 and pass under a reciprocating glue nozzle assembly 23 having a series of glue nozzles 24, each of which deposits a sinuous glue pattern 24a onto the corrugated pieces 16 as shown in FIG. 2. The glue nozzle assembly 23 is shown in FIG. 5 and oscillates the respective glue nozzles 24 in a direction generally perpendicular to the direction of travel of the corrugated pieces 16. A rotating disk 26 driven by a motor (not shown) having a linkage 28 eccentrically and pivotally attached thereto is pinned or otherwise connected to a bar 30. The glue nozzles 24 are secured to or seated in the bar 30. The bar 30 oscillates as a result of the rotation of the motor driven disk 26 thereby moving the glue nozzles 24 back and forth in a cross-wise direction to deposit the sinuous glue pattern 24a onto the corrugated pieces 16 moving under the glue nozzles 24.

As shown in FIGS. 1 and 3A, the glue nozzle assembly 22 is positioned over a gap 32 between the conveyors 20 and a second series of nine conveyors 34. The gap 32 permits excess glue discharged from the nozzles 24 and not applied to the corrugated pieces 16 to be collected in a reservoir (not shown) below the conveyors 20, 34 so as not to contaminate nor interfere with the conveyor operation.

Figure 4:
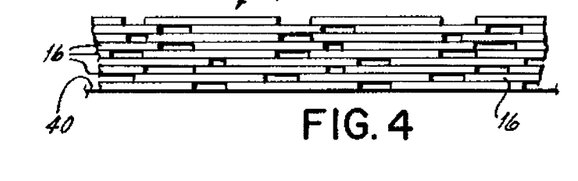
FIG. 4 is a cross-sectional schematic view of an arrangement of corrugated pieces

The corrugated pieces 16 are deposited onto the series of generally parallel and successively longer conveyors 34 after passing under the glue nozzle assembly 22. The corrugated pieces 16 are then dispensed from the series of conveyors 34 onto a continuously moving conveyor 40. The speed of this conveyor 40 is controlled to give a desired stacking arrangement of the individual pieces 16. The individual pieces 16 on conveyor 40 are preferably caused to be disposed in a bridge-like configuration, as illustrated schematically in FIG. 4, wherein pieces 16 bridge spaced pieces 16 below them. To accomplish this, the conveyor 40 is run at about the same speed as the second set of conveyors 34 to place edge aligned individual corrugated pieces 16 on the conveyor 40 without overlap but spaced one from another. The random spacing of the pieces 16 on the nine conveyors 34 will cause a number of the pieces 16 to bridge one another forming an array 47 of corrugated pieces generally nine high in the bridge-like configuration shown in FIG. 4. Additionally, the conveyor 40 speed and the number of conveyors used can be chosen to cause the individual corrugated pieces 16 to be dispensed in an array which is a shingle-like, bridge-like, or combination of both configurations. In the embodiment shown in the drawings and described throughout, only the bridge-like configuration is shown, it being understood that the description of the invention is equally applicable to the other configurations just mentioned.

In loading, provision can be made for insuring that the flutes of the individual pieces 16 are aligned as illustrated by the arrows 41 in FIG. 1. However, that is not critical to the invention, and pieces 16 having their flutes at 90° to the others (as illustrated by arrows 42) can be used without detracting from the invention.

The corrugated pieces 16 are deposited onto the moving conveyor 40 and the other corrugated pieces in an orderly fashion with their longitudinal axis generally collinear in order to form the array 47. As each corrugated piece 16 approaches a trailing end 34b of the respective conveyor 34, a roller 43 is positioned above the top run of the conveyor 34 proximate the trailing end 34b thereof as shown in FIG. 3A. The roller 43 maintains the corrugated piece 16 in a generally horizontal attitude, thereby preventing it from tipping downward until the leading edge of the piece 16 contacts an edge guide 44 positioned on the lateral edge above the upper run of the conveyor 40. The movement of the conveyors 34,40, the roller 43 and the edge guide 44 cooperate to control the corrugated piece 16 as it is transferred onto the conveyor 40. Successive pieces 16 accumulate thereon to form the orderly and aligned array 47 of corrugated pieces 16.

The pieces 16 moving on the conveyor 34 engage the edge guide 44 and are thus caused to turn and edge align themselves one with another, if desired, with the flutes being for the most part aligned. The conveyor 34 conveys the individual corrugated pieces 16 toward the edge guide 44 of the conveyor 40. As a consequence of the loading and conveying of the individual pieces 16 onto the conveyor 40, they are caused to stack up upon each other, as illustrated by profile in FIG. 4.

Figure 3B:
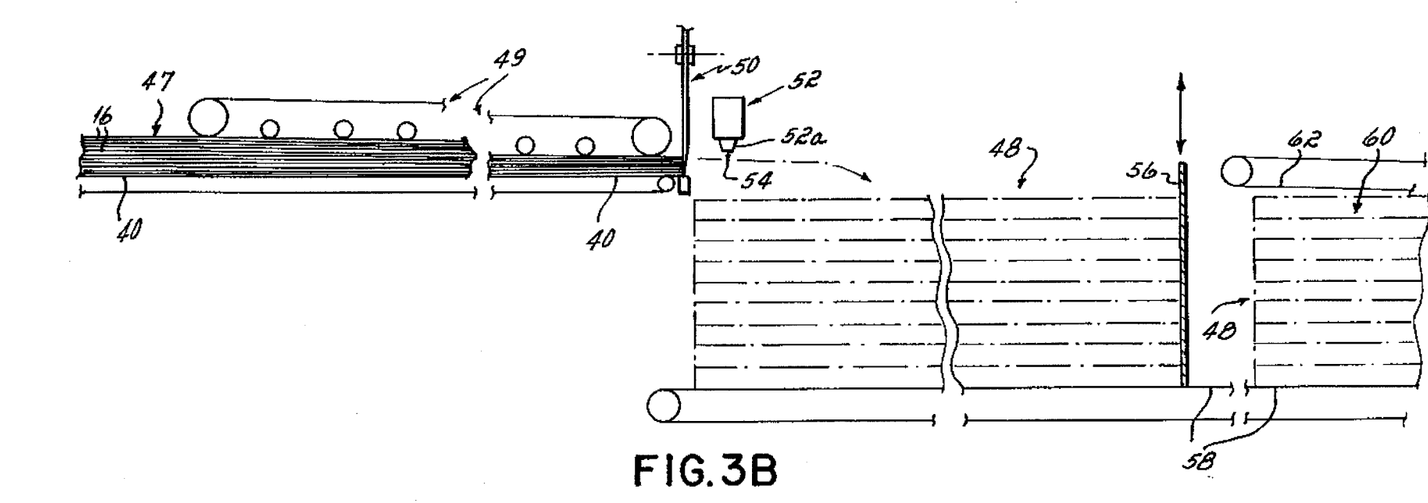

The individual pieces 16 are glued to adjacent pieces as a result of the adhesive applied thereto by the glue nozzle assembly 22. The conveyor 40 moves continuously and carries the array 47 of layered corrugated pieces 16 down the length of the conveyor 40 (FIG. 3B). Because of the bridge-like configuration, this array of individual cardboard pieces adhered together is on the order of about 2¼ inches in height. The conveyor 40 carries the moving array 47 to a cutoff device 50, such as a rotary knife, which is operable to cutoff a predetermined length 48 of the moving array 47 on the fly. This length can be any length desired, for example, on the order of 3 to 6 feet. The stack passes under an overhead, continuously moving belt 49 which applies a compressive force to the stack compressing it and increasing the adherence of the multiple layers to each other.

The cut off pieces 48 pass under a glue dispensing head 52 wherein additional adhesive 54 is applied to the upper face of the array 48 of individual corrugated pieces 16. This glue dispensing head 52 includes a nozzle 52a having a plurality of orifices spaced across the width of the conveyor 40 which dispense continuous streams 54 of adhesive onto the array 48.

The cut lengths 48 are thrown forward against a vertical stop plate 56 and onto a continuously moving conveyor 58 to build up a stack 60 of individual lengths 48 of corrugated pieces 16 as shown in FIG. 3B. The stack 60 can be built up to any desired height, for example, on the order of 12 inches high. When the stack 60 reaches the desired height, the end stop 56 is raised which permits the conveyor 58 to move the stack 60 with the layers 48 adhered to one another forward. The stack 60 passes under an overhead, continuously moving belt 62 which applies a compressive force to the stack 60 compressing it and increasing the adherence of the multiple layers 48 to each other. The resulting composite article is a block 64 of defined length, width, and height having multiple, generally planar layers 48 of individual corrugated cardboard pieces 16 adhered together in a shingle-like configuration, a bridge-like configuration, or a combination of the two, with the length of the individual pieces in any vertical plane being only a fraction of the full length of the finished article 64.

The composite article 64, which as stated is in the form of a block of defined height, width, and length, may be used as is as a structural component or individual pieces may be sawed from the block and joined together to form desired articles of manufacture. For purposes of illustrating such an application, the manufacture of a shipping pallet 65 (FIG. 6) from the block 64 of scrap corrugated will now be described with reference to FIGS. 7–9.

Figures 7, 8:
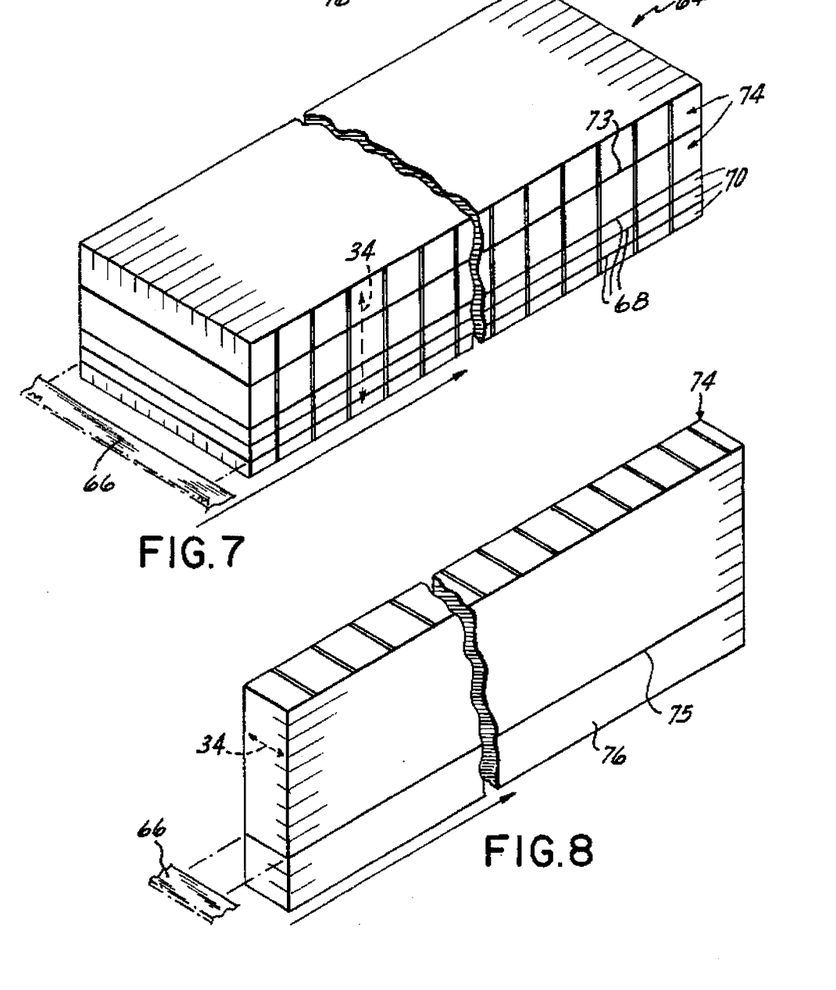
FIG. 7 is an isometric schematic illustration of the composite article exiting the conveyor illustrating the saw lines for manufacture of a pallet.
FIG. 8 is a schematic illustration of a slab cut from the article illustrated in FIG. 7.

Referring first to FIG. 7, the composite article 64 is rotated 90° and moved into a saw station including a horizontal band saw 66. By rotating the article 90°, the original 8½-inch width dimension is now the vertical dimension. If the flutes of the corrugated have been for the most part aligned as shown in FIG. 1, they will now run in a vertical direction. Individual saw cuts 68 are made to manufacture the various components. For example, in manufacturing of the pallet 65, three slabs 70, each being about 1-inch in height, are cut along lines 68 from the block 64 by means of the band saw 66 to form the top panel 72. Then two additional slabs 74, about 2½ inches thick, are cut by cutting along line 73. The slabs 74 are again cut along line 75 in a perpendicular direction as shown in FIG. 8 by means of the band saw 66 to form supports beams 76, which are generally square in cross-section.

Figure 9:
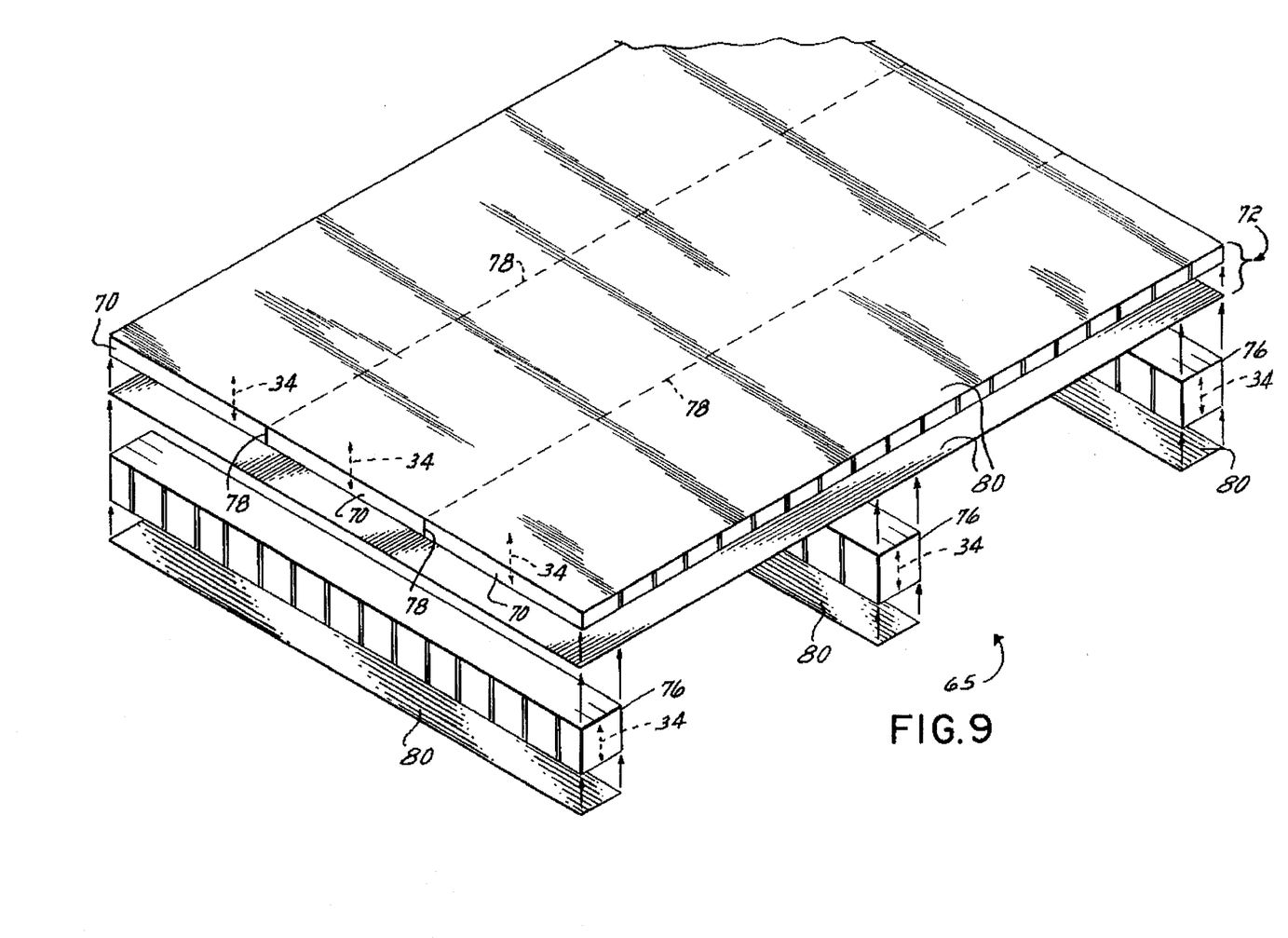
FIG. 9 is an isometric schematic illustration of the method of assembly of the pallet of the present,invention.

Referring now to FIG. 9, the top panel slabs 70 are then abutted and glued together along their side faces (illustrated by lines 78) with the flutes running in a vertical direction perpendicular to the upper and lower faces. Linerboard sheets 80 which may be, for example, 69 pound or less kraft paper are adhered to the upper and lower planar faces of the top panels 72. This may be done by bringing linerboard 80 off of rolls onto the upper and lower faces and applying glue thereto to glue the assembly together. The support beams 76 are then placed at either end and the midpoint of the underside of the top panel 72 and adhered to the facing linerboard sheet. The support beams 76 can be oriented such that the flutes likewise run in a direction perpendicular to the faces of the top panel. This arrangement in combination with the flutes of the top panel provides the maximum compressive strength of the pallet. Facing sheets of linerboard 80 may likewise be applied to the underside of the support beams 76, if desired.

Figure 6:
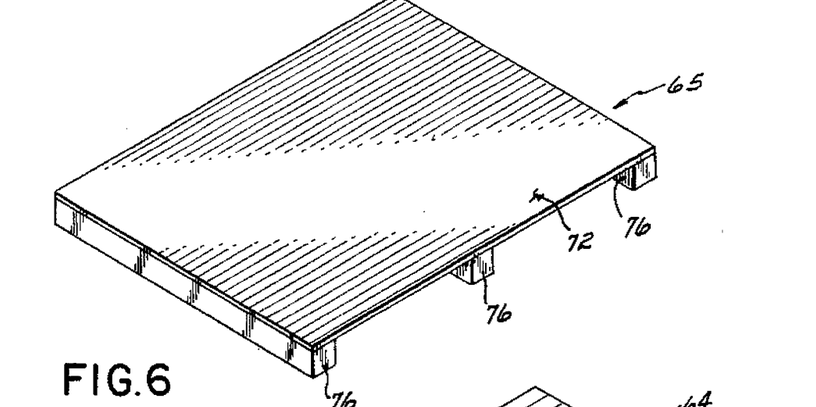
FIG. 6 is an isometric pictorial illustration of a completed shipping pallet.

The resulting product is shown in FIG. 6 and comprises an upper horizontal top panel 72 supported by three support beams 76 adhered to the underside thereof at either end and along the midpoint. The beams 76 offset the top panel 72 from the floor whereby the tines of a forklift truck can be inserted thereunder to lift the pallet and load secured thereon. As stated, superior compressive strength is obtained by orienting the flutes in the vertical direction. An increase in strength is also obtained by the linerboard facing sheets 80 glued thereto and the support beams 76 glued to the underside of the top panel 72. The pallet 65 thus is made entirely of scrap corrugated and contains no nails or other materials which would present disposal problems and is not subject to cracking or splintering. Importantly, however, the pallet can be made substantially more inexpensively than wood pallets can. Finally, the pallet of the present invention is easily disposed of merely by shipping the pallets to a hydropulper where they may be pulped and the resulting material reused to manufacture paper or paperboard.

The composite article of the present invention has a number of applications for use as a material of construction. Its use in constructing a shipping pallet as described above is but one application. The material can be used, for example, for forming the core of a door in that the material provides strength against crushing of the door as well as insulative and sound deadening properties. The material may be used in other applications as well requiring either compressive strength in a given direction or insulative properties. Other uses contemplated include as a packing material to replace either corrugated stock or Styrofoam which itself presents disposal problems.

The present invention further provides a material of construction that can be used as a substitute for lumber. For example, the material of the present invention provides a substitute for lumber of standard cross-sectional dimensions such as a nominal two inch by four inch or a nominal four inch by four inch product. The advantages of the present invention are, among others, that a recycled material is used as a substitute for virgin lumber and that the recycled material is substantially more readily disposable than lumber. That is, in accordance with the principles of the invention as express above, the composite material of the present invention may be disposed of simply by hydropulping.

Figure 3C:
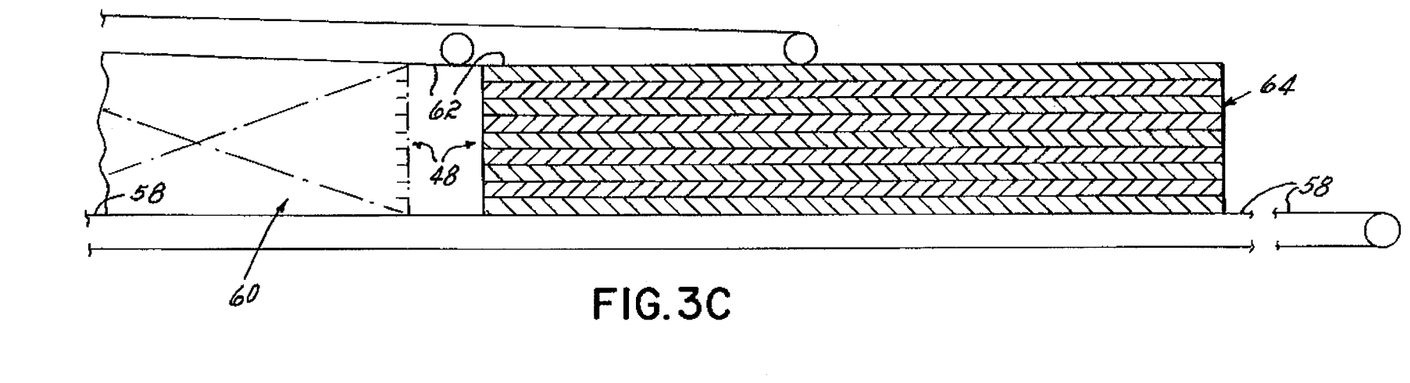
Figure 10:
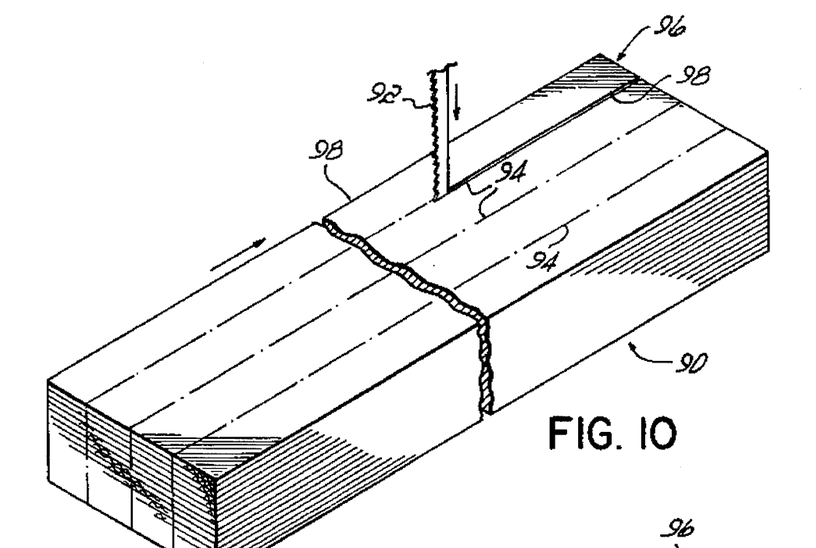
FIG. 10 is an isometric schematic illustration of the composite article of the present invention prior to sawing of individual pieces of desired dimension.
Figures 11, 12:
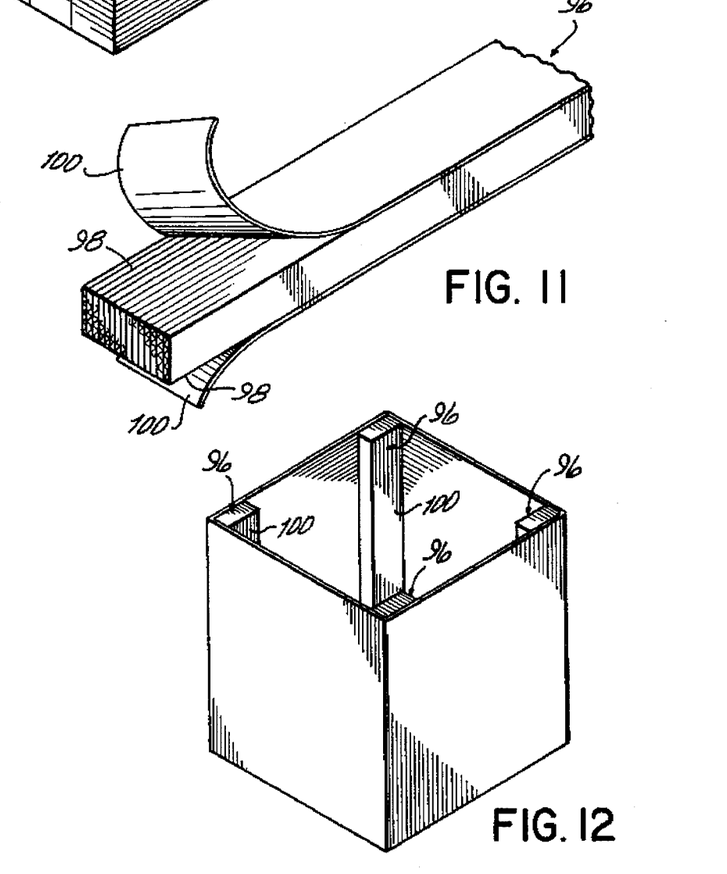
FIG. 11 is an isometric schematic illustration of a piece cut from the article of FIG. 10 as manufactured as a lumber substitute.
FIG. 12 is an isometric pictorial illustration of a completed shipping container utilizing the present invention.

In the manufacture of a substitute material for lumber according to a presently preferred form of the invention, a block 90 is formed generally in the same manner as block 64 shown as the product of the method illustrated in FIGS. 3A–3C. Block 90 is then be sawed by means of a bandsaw 92 into pieces on the order of 1½ inch in thickness along lines 94. If the block 90 is manufactured with height of approximately 4 inches, the resulting cut pieces 96 will have a nominal cross-sectional dimension of 2 inch by 4 inch. The block 90 may be manufactured in any desired length, e.g., 4 feet long. Although four saw lines 94 are shown in FIG. 10 for purposes of illustration, it will be appreciated that when the block 90 is made so as to be 8 inches wide, then 6 pieces 96 of an approximate 1½ inch width would be cut therefrom. Referring in addition to FIG. 11, each of the two facing surfaces 98 of the individual pieces 96 may be provided with a paper face by adhering paper sheet 100 thereto to provide the completed product as shown in FIG. 11.

The resulting product has a number of applications. As a general proposition, it may be used wherever wooden 2 by 4's are used. In one application illustrated in FIG. 12, the composite articles 96 are stapled or glued into the corners of a box 102 formed, for example, of corrugated board and extending the height of the box 102. The composite articles 96 thus form corner posts to provide the box with stacking strength. Again, when it is desired to dispose of the box, the entire box 102 including the corner posts 96 may be simply hydropulped.

Figure 13:
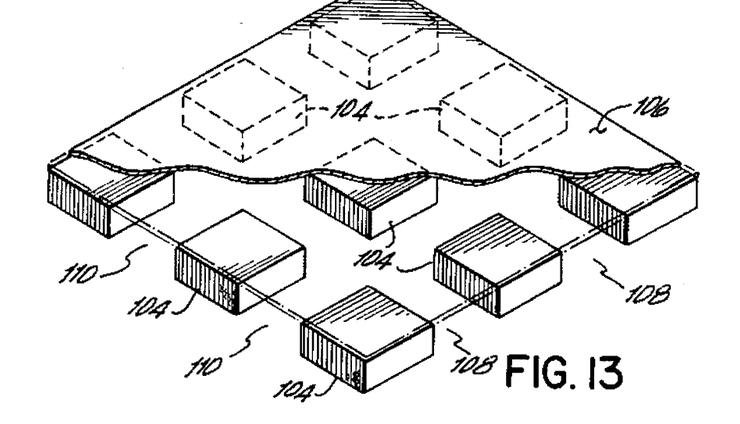
FIGS. 13 and 14 are isometric schematic illustrations of alternative embodiments of a shipping pallet.

An additional application of the composite article of the present invention is in the manufacture of shipping pallets. In addition to the shipping pallets described above, referring now to FIG. 13, pallets can also be manufactured by forming, for example, 8 inch by 8 inch by 3 inch high blocks 104. Nine of these blocks are equally spaced, and a top sheet 106 adhered thereto. The top sheet 106 may be, for example, linerboard or chipboard or formed of a paper honeycomb material. The spacing between the blocks provides openings 108, 110 for receiving a lift platen such as the tines of a forklift truck (not shown) in either lateral direction. Again, use of the composite material of the present invention eliminates the need for wooden pallets and the cost and disposal problems attendant therewith. Further, it is important to realize that an 8"×8"×3" block of the composite material of the present invention weighs on the order of only about 1 pound. Accordingly, the pallet is not only substantially less expensive to manufacture and more easily disposed of, but also it is lighter in weight.

Figure 14:
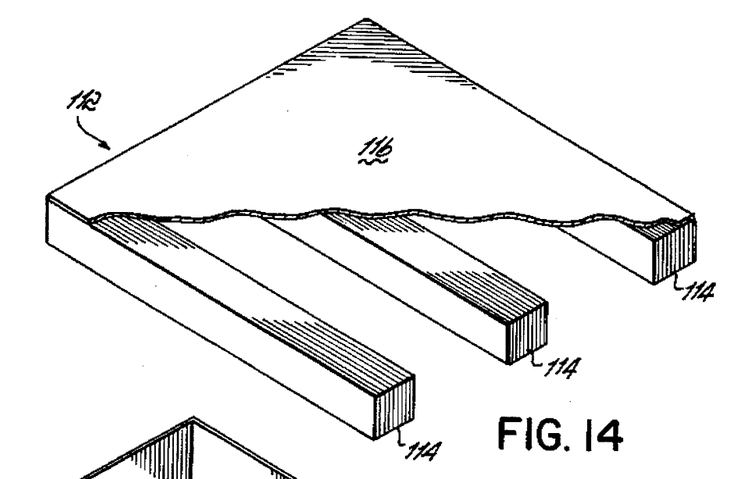

Referring now to FIG. 14, a shipping pallet 112 may be constructed by forming runners 114 of the composite material of the present invention in the same manner as illustrated above particularly with reference to FIGS. 7, 8, and 9. In this case, however, a sheet 116 of linerboard, chipboard, or paper honeycomb is adhered to the three spaced runners 114 to form the shipping pallet 112.

Figure 15:
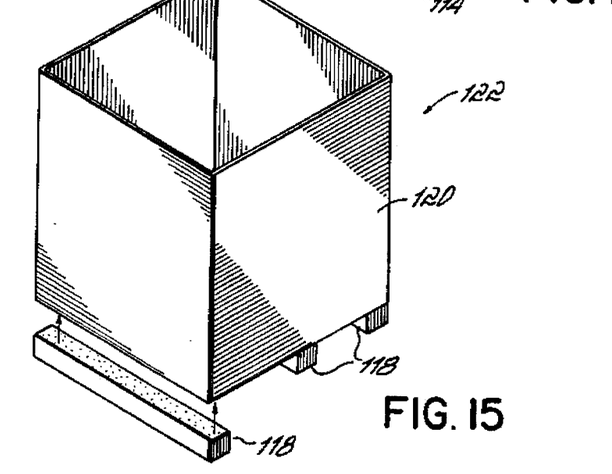
FIG. 15 is an isometric illustration of a second form of shipping container.

In an alternative embodiment as illustrated in FIG. 15, runners 118 formed of the composite material of the present invention are themselves adhered to the closed bottom of a container 120 to provide a container 122 which may be lifted by a forklift.

In all, the present invention provides not only for the disposal of scraped corrugated boxes and sheets but also a resulting material of construction having superior properties and economies.

Thus having described the invention, what is claimed is:

1. A composite article useful as a material of construction comprising a plurality of substantially aligned, individual pieces of corrugated cardboard cut from scrap corrugated boxes or sheets, said pieces being disposed and adhered with respect to one another such that they lie in a shingle-shaped configuration, a configuration of unconnected pieces being adjoined by a piece deposited on top thereof and spanning unconnected pieces, or a combination thereof and forming multiple, generally planar layers comprised of said individual corrugated cardboard pieces having a length only a fraction of the full length of the article, said article having opposed generally planar faces, and paper sheets adhered to said opposed generally planar faces.

2. The composite article of claim 1 wherein said article has a nominal cross-sectional dimension of 2 inches by 4 inches.

3. The composite article of claim 1 wherein said article has a nominal cross-sectional dimension of 4 inches by 4 inches.

4. A shipping container comprising a box having four planar walls intersecting to form four internal corners, a top and a bottom, and a vertical support secured in each of said four corners and extending from said bottom to said top, each said vertical support comprising a plurality of substantially aligned, individual pieces of corrugated cardboard cut from scrap corrugated boxes or sheet, said pieces being disposed and adhered with respect to one another such that they lie in a shingle-shaded configuration, a configuration of unconnected pieces being adjoined by a piece deposited on top thereof and spanning unconnected pieces, or combination thereof and forming multiple, generally planar layers comprised of said individual corrugated pieces having a length only a fraction of the full length of said rigid support.

5. A shipping pallet comprising:

a plurality of spaced support members having opposed generally planar surfaces and comprising a plurality of substantially aligned, individual pieces of corrugated cardboard cut from scrap corrugated boxes or sheets, said pieces being disposed and adhered with respect to one another such that they lie in a shingle-shaped configuration, a configuration of unconnected pieces being adjoined by a piece deposited on top thereof and spanning unconnected pieces, or a combination thereof and forming multiple, generally planar layer comprised of said individual corrugated cardboard pieces and having a length only a fraction of the full length of said support members, and a generally planar sheet adhered to one of said planar surfaces of said plurality of spaced support members, said support members being spaced with respect to one another to provide channels for insertion of a lifting platen underneath said planar sheet.

6. The shipping pallet of claim 5 wherein said support members extend the entire width of said support sheet.

7. The shipping pallet of claim 5 wherein said support members have a widthwise and lengthwise direction less than the width and length of said support sheet.

8. A shipping container comprising a box having side walls and a closed bottom and support members adhered to the outer surface of said bottom, said support members comprising a plurality of substantially aligned individual pieces of corrugated cardboard cut from scrap corrugated boxes or sheets, said pieces being disposed and adhered with respect to one another such that they lie in a shingle-shaped configuration, a configuration of unconnected pieces being adjoined by a piece deposited on top thereof and spanning unconnected pieces, or a combination thereof and forming multiple, generally planar layers comprised of said individual corrugated cardboard pieces having a length only a fraction of the full length of said support members.

* * * * *